United States Patent [19]

Petit

[11] Patent Number: 5,372,712

[45] Date of Patent: Dec. 13, 1994

[54] BIOMASS GROWTH CONTROL APPARATUS FOR FLUID BED BIOLOGICAL REACTOR

[75] Inventor: Peter J. Petit, Waukesha, Wis.

[73] Assignee: Envirex Inc., Waukesha, Wis.

[21] Appl. No.: 25,353

[22] Filed: Feb. 25, 1993

[51] Int. Cl.$^5$ .............................................. C02F 3/06
[52] U.S. Cl. ............................... 210/151; 210/195.3; 210/256; 210/540; 210/618
[58] Field of Search ............... 210/122, 150, 151, 106, 210/256, 258, 259, 195.1, 195.3, 617, 618, 512.1, 519, 521, 540

[56] References Cited

U.S. PATENT DOCUMENTS

| | | | |
|---|---|---|---|
| 306,169 | 10/1884 | Moseley | 210/540 |
| 306,171 | 10/1884 | Moseley | 210/540 |
| 1,147,881 | 7/1915 | Morris | 210/540 |
| 2,579,304 | 12/1951 | Crawford | 210/540 |
| 2,786,801 | 3/1957 | McKinley et al. | 196/53 |
| 3,846,289 | 11/1974 | Jeris et al. | 210/618 |
| 3,879,287 | 4/1975 | Porter | 210/33 |
| 3,956,128 | 5/1976 | Turner | 210/150 |
| 3,956,129 | 5/1976 | Jeris et al. | 210/189 |
| 4,009,098 | 2/1977 | Jeris | 210/618 |
| 4,009,099 | 2/1977 | Jeris | 210/618 |
| 4,009,105 | 2/1977 | Jeris | 210/107 |
| 4,080,287 | 3/1978 | Conway et al. | 210/617 |
| 4,177,144 | 12/1979 | Hickey et al. | 210/86 |
| 4,182,675 | 1/1980 | Jeris | 210/618 |
| 4,200,524 | 4/1980 | Levin | 210/618 |
| 4,202,774 | 5/1980 | Kos | 210/274 |
| 4,250,033 | 2/1981 | Hickey et al. | 210/106 |
| 4,322,299 | 3/1982 | Scholten et al. | 210/794 |
| 4,412,924 | 11/1983 | Feather | 210/744 |
| 4,464,262 | 8/1984 | Owens et al. | 210/291 |
| 4,466,928 | 8/1984 | Kos | 261/76 |
| 4,469,599 | 9/1984 | Gros et al. | 210/610 |
| 4,477,393 | 10/1984 | Kos | 261/76 |
| 4,507,253 | 3/1985 | Wiesmann | 261/22 |
| 4,707,252 | 11/1987 | Durot et al. | 210/618 |
| 4,749,654 | 6/1988 | Karrer et al. | 435/240.21 |
| 4,892,666 | 1/1990 | Paulson | 210/521 |
| 5,011,597 | 4/1991 | Canzoneri et al. | 210/104 |

FOREIGN PATENT DOCUMENTS

| | | |
|---|---|---|
| 2626868 | 8/1989 | France . |
| 0122997 | 7/1982 | Japan . |
| 6279896 | 4/1987 | Japan . |

Primary Examiner—Christopher Upto
Attorney, Agent, or Firm—Michael, Best & Friedrich

[57] ABSTRACT

A reactor apparatus including a fluid bed reactor wherein liquid to be processed is conducted upwardly therein through a bed to fluidize the bed, the bed including particulate solids having biological material supported thereon, and the liquid forming an effluent head above the bed. The reactor apparatus also includes a control apparatus for removing excess biological material from the reactor. The control apparatus includes a tubular separator column which is emersed in the liquid effluent head, and a telescoping sludge valve that has a draw-off port communicating openly with the effluent head surface and that is adjustable to raise and lower the draw-off port relative to the effluent head surface to control the sludge withdrawal rate. The control apparatus also includes an agitator arrangement that withdraws bed particles from the separator column, shears excess biological material from those particles, and then returns the partially sheared particles and sheared biological material to the separator column. The returned material is pumped tangentially into the separator column to induce hydrocyclonic action in the separator column.

20 Claims, 1 Drawing Sheet

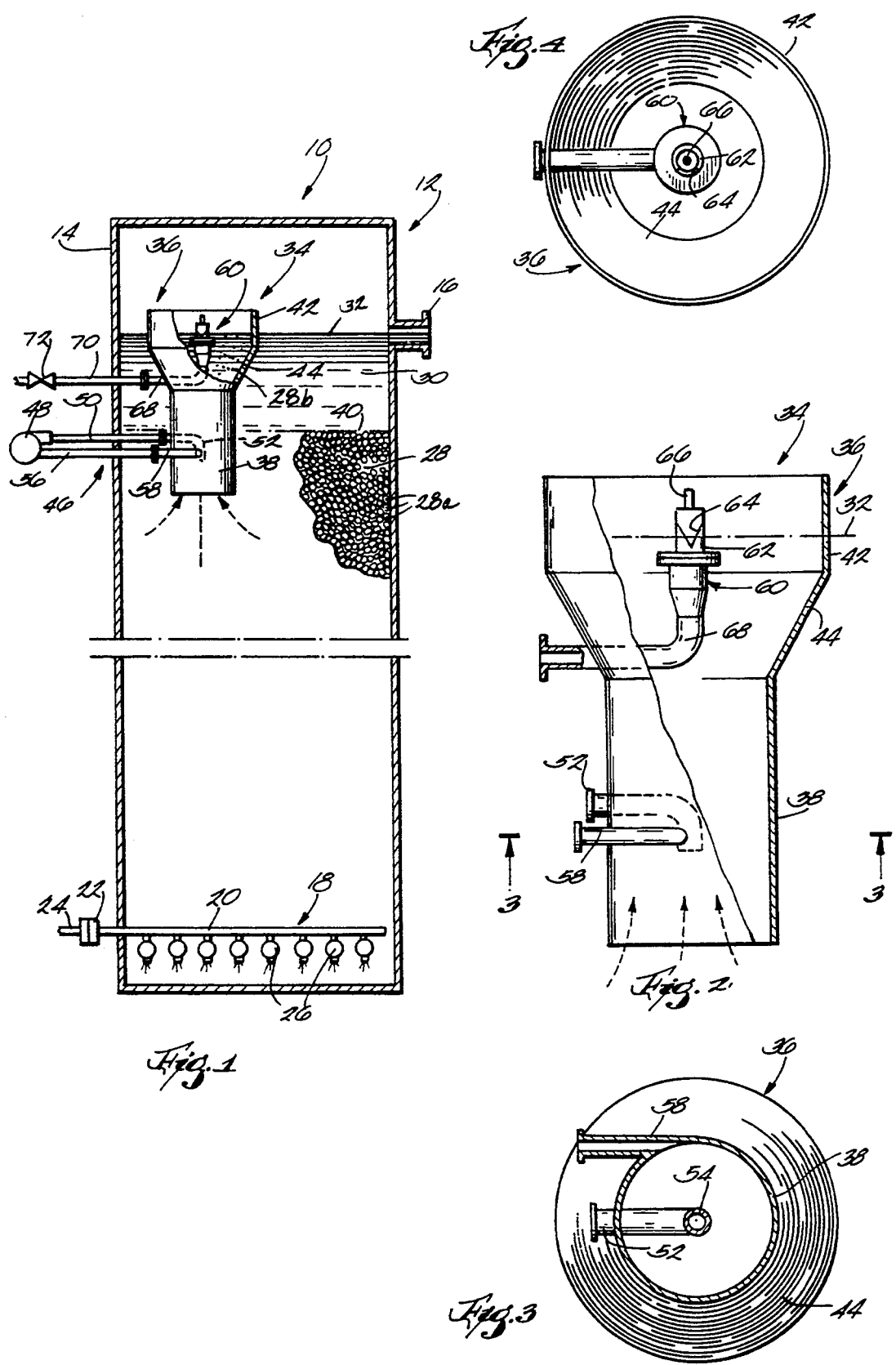

5,372,712

BIOMASS GROWTH CONTROL APPARATUS FOR FLUID BED BIOLOGICAL REACTOR

BACKGROUND OF THE INVENTION

1. Field of the Invention

The invention relates generally to fluid bed biological reactors including bed particles supporting biological material, and more particularly to control apparatus incorporated into fluid bed biological reactors to remove excess biological material therefrom.

2. Reference to Prior Art

Fluid bed reactors are used in the biological processing of waste water. A fluid bed biological reactor includes a reactor tank containing a media bed of particulate solids, such as sand or activated carbon, which sere as a substrate for microorganisms. The waste water is conducted upwardly through the reactor tank at a velocity sufficient to fluidize the media bed, and the microorganisms are nourished under aerobic conditions by impurities in the upflow to process the waste water. The principles of operation of fluid bed biological reactors are provided in the following U.S. patents: U.S. Pat. No. 4,202,774 issued May 13, 1980 to Kos; U.S. Pat. No. 4,182,675 issued Jan. 8, 1980 to Jeris; U.S. Pat. Nos. 4,009,105, 4,009,099 and 4,009,098, all issued Feb. 22, 1977 also to Jeris; and U.S. Pat. No. 3,956,129 issued May 11, 1976 and U.S. Pat. No. 3,846,289 issued Nov. 5, 1974, both to, Jeris et al.

Excess biological material (i.e., biological material in excess of that needed for normal reactor operation) must be removed from the reactor to insure its proper and efficient operation, as discussed in U.S. Pat. No. 4,177,144 issued Dec. 4, 1979 to Hickey et al. In the above-mentioned Jeris and Jeris et al. patents, the growth of biological material in the media bed is monitored as a function of bed expansion by a sensing device. When the media bed reaches a predetermined height to activate the sensing device, the bed particles are abraded with a mechanical stirrer to strip excess biological material therefrom. The partially stripped bed particles settle back into the media bed and the excess biological material is carried away in the reactor effluent stream. This is undesirable since sludge dewatering equipment, etc. must be added to the system downstream of the reactor to separate and remove the excess biological material from the treated effluent stream.

U.S. Pat. No. 4,177,144 illustrates an excess biological growth control system including an agitator positioned in a separator column that is emersed in an effluent head above the media bed. Biological material separated from the bed particles by the agitator is confined within the separator column and withdrawn therefrom at a point below the surface of the effluent head. The use of the separator column is intended to prevent biological material from entering the reactor effluent stream. However, in the foregoing arrangement there is a potential for accumulation of biological material in the separator column that can inhibit operation of the control system. A further disadvantage of the control system is the high water content of the sludge (i.e., waste biological material and liquid) withdrawn from the separator column, this high water content necessitating the inclusion of significant dewatering equipment into the control system.

SUMMARY OF THE INVENTION

The invention provides a reactor apparatus including an improved bed growth control apparatus for removing excess biological material from the reactor. The improved control apparatus operates to withdraw sludge from the effluent head surface in a separator column to prevent the accumulation of scum which can result in "surface caking". Also, by withdrawing sludge from the effluent head surface the liquid content thereof can be more carefully controlled and minimized to reduce or eliminate associated liquid/biological material separation equipment (e.g. dewatering equipment). The control apparatus is also operated to provide a hydrocyclonic upflow within the separator column to prevent accumulation of biological material in the separator column which can result in "filter caking" below the effluent head surface.

More particularly, the control apparatus includes a tubular separator column which is emersed in the liquid effluent head in the reactor and which extends downwardly into the media bed. The separator column has a non-constant diameter configuration to provide an upflow velocity profile therein that promotes upward travel of unattached biological material to the effluent head surface while restricting upward travel of heavier media bed particles. To remove the unattached biological material from the effluent head surface in the separator column, the control apparatus is provided with a telescoping sludge valve having a draw-off port that communicates openly with the effluent head surface. The sludge valve is telescopically adjustable to raise and lower the draw-off port relative to the effluent head surface to control the sludge withdrawal rate and to thereby achieve an upflow velocity in the separator column suitable for the particular application. The control apparatus also includes an agitator arrangement that withdraws media bed particles from the separator column, shears excess biological material from those particles, and then returns the partially sheared particles and sheared biological material to the separator column. The returned material is pumped tangentially into the separator column to circulate the contents thereof and to induce the aforementioned hydrocyclonic action in the separator column.

Other features and advantages of the invention will become apparent to those skilled in the art upon review of the following detailed description, claims and drawings.

BRIEF DESCRIPTION OF THE DRAWINGS

FIG. 1 is a partially schematic side elevational view, partially in section, of a fluid bed reactor apparatus including a bed growth control apparatus embodying features of the invention.

FIG. 2 is an enlarged partially cross-sectional view of the control apparatus illustrated in FIG. 1.

FIG. 3 is a view taken along line 3—3 in FIG. 2.

FIG. 4 is an elevational view of the control apparatus illustrated in FIG. 2.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Illustrated in the drawings is a reactor apparatus 10 embodying the invention. The reactor apparatus 10 is used to process a liquid, such as waste water, and can, depending on processing requirements, be used alone or in combination with other upstream or downstream treatment devices (not shown) as is understood by those skilled in the art.

As shown in FIG. 1, the reactor apparatus 10 comprises a reactor 12. The reactor 12 includes a columnar reactor tank 14 having a discharge port 16 adjacent its upper end, and a flow distributor 18 or other suitable means for introducing liquid into the reactor tank 14. The flow distributor 18 includes a header member 20 adjacent the base of the reactor tank 14 and an inlet 22 connected to a line 24 for supplying liquid from a remote source. The header member 20 is manifolded to a plurality of nozzle studded lateral pipes 26 which evenly distribute the incoming liquid throughout the cross-section of the reactor tank 12.

The illustrated reactor 12 is a fluid bed biological reactor and includes a media bed 28 which is contained in the reactor tank 14 and which is fluidized by a sufficient upward flow of liquid. The bed 18 is comprised of particulate solids, preferably granular activated carbon, which act as carriers to support biological material. The particular biological material (or "bugs") employed can be selected to accomplish the particular processing objectives.

The reactor 12 is operated by pumping liquid from the line 24, the liquid typically being first subjected to an upstream oxygenation process, into the reactor tank 14 through the flow distributor 18 at a rate sufficient to fluidize the media bed 28. As the liquid passes through the fluidized media bed 28 the biological material therein, under aerobic conditions, consumes or neutralizes the unwanted impurities in the liquid to produce treated effluent. The treated effluent forms a liquid effluent head 30 above the media bed 28. In the illustrated arrangement, the level of the effluent head surface 32 is controlled by the discharge port 16 which withdraws treated effluent for further downstream treatment or for discharge into the environment. The biological action within the reactor 12 also produces biological cellular growth.

To control biological growth and media bed expansion resulting therefrom, the reactor apparatus 10 is provided with means for removing excess biological material from the reactor 12. In the illustrated arrangement, such means includes a bed growth or biomass control apparatus 34. The control apparatus 34 includes a biomass control tube or separator column 36 emersed in the effluent head 30 and supported in the reactor 12 by suitable means such as brackets (not shown). The separator column 36 has a cylindrical lower or bottom section 38 extending downwardly preferably below the level of the media bed 28 when fluidized, that level being indicated in FIG. 1 by the reference numeral 40. The separator column 36 also includes a larger diameter cylindrical upper or top section 42 extending above the effluent head surface 32, and a frustoconical intermediate section 44 converging downwardly from the upper section 42 to the lower section 38.

To separate excess biological material from the particulate solids, the control apparatus 34 is provided with an agitator apparatus 46 associated with the separator column 36. In the embodiment illustrated in the drawings, the agitator apparatus 46 includes a biomass pump 48 or other suitable means for shearing excess biological material from the particulate solids. The agitator apparatus 34 also includes means such as a suction conduit 50 for withdrawing particulate solids having excess biological material thereon from the separator column 36. The suction conduit 50 includes an elbow section 52 (FIGS. 2 and 3) having an downwardly opening inlet 54 that is concentric with the separator column 36 and that communicates directly with the fluidized media bed 28. The agitator apparatus 46 is also provided with means for returning the partially sheared particulate solids and the sheared biological material generated by the biomass pump 48 to the separator column 36. For reasons more fully explained below, it is preferred that the sheared matter be returned tangentially to the separator column 36. Accordingly, in the illustrated arrangement the return means includes a return conduit 56 having an end portion 58 extending tangentially from the separator column 36 (See FIG. 3) so that the sheared matter introduced into the separator column 36 is given a tangential velocity.

The control apparatus 34 also includes means communicating with the effluent head surface 32 for withdrawing the sheared excess biological material generated by the biomass pump 48 from the separator column 36. While various means for withdrawing the sheared excess biological material can be employed, in the illustrated arrangement such means includes a telescoping sludge valve 60. As shown in FIGS. 1 and 2, the sludge valve 60 is positioned in the separator column 36 above the fluidized bed level 40. The sludge valve 60 includes a vertically extending conduit or tube 62 having a vertically extending draw-off opening or port 64 formed by a V-shaped notch extending downwardly from the upper end of the tube 62. The draw-off port 64 communicates with the effluent head surface 32 and acts as an overflow weir to withdraw sludge therefrom. The vertical position of the draw-off port 64 is adjustable by telescoping the tube 62, such as with a manually operable adjustor rod 66. To increase and decrease the flow rate of sludge withdrawn from the separator column 36 the tube 62 is lowered and raised, respectively, to vary the area of the draw-off port below the effluent head surface 32.

The sludge valve 60 includes a lower elbow section 68 (FIG. 2) extending outside of the separator column 36 and communicating with a biomass waste line 70 that is preferably oversized to accomodate the thickness of the sludge. The waste line 70 is provided with a suitable valve 72 which effectively operates to open and close the sludge valve 60 by opening and closing the line 70. The waste line 70 delivers the sludge to dewatering equipment or other suitable processing equipment, or to a disposal site. The liquid constituent of the sludge, if separated, can thereafter be returned to the reactor 12 or otherwise disposed of.

The sludge valve 60 is operable to control upflow velocity in the separator column 36 by withdrawing more or less sludge through the draw-off port 64. In particular, the sludge valve 60 is adjustable to vertically position the draw-off port 64 relative to the effluent head surface 40 to set a desired sludge removal rate. In a preferred embodiment of the invention, the sludge valve 60 is adjusted so that the ratio of the vertical area of the draw-off port 64 below the effluent head level 40 to the horizontal area of the bottom section 38 of the separator column 36 is at least 10% greater than the ratio of the vertical area of the discharge port 16 below the effluent head level 32 to the horizontal area of the reactor tank 14. This adjustment setting provides sufficient upflow velocity in the separator column 36 to ensure that the fluidized bed level within the separator column 36 is as great as, and preferably slightly greater than, the fluidized bed level 40 outside of the separator column 36 so that the media bed 28 is drawn into the separator column 36.

During reactor operation the control apparatus 34 can be continually or intermittently operated, as desired for the particular application in which the control apparatus 34 is employed. For example, for intermittent automatic operation, an optical sensor (not shown) or other suitable sensing device can be provided for monitoring media bed expansion or other condition indicative of excess biological growth in the reactor 12. When the media bed 28 reaches proportions indicating excessive biological growth, the optical sensor can signal a control unit (not shown) to activate the control apparatus 34 by starting the biomass pump 48 and opening the valve 72.

When the control apparatus 34 is operational, the sludge valve 58 is adjusted to provide an upflow velocity in the separator column 36 between the settling velocities of biological material-laden particulate solids and sheared biological material. The sludge valve 58 is preferably optimally set to induce an upflow velocity high enough to draw the media bed 28 into the lower section 38, but not so high as to unnecessarily dilute sludge withdrawn from the effluent head surface 32 or to withdraw lighter bed particles from the reactor 12. Thus, some experimentation may be required to achieve an optimum setting. To aid in this regard and to increase the operating range of the control apparatus 34, the top section 42 is enlarged to defluidize the media bed 28 should it rise to that level. This reduces the loss of light particulate solids from the reactor 12.

As the media bed 28 is drawn upwardly into the separator column 36, the biomass pump 48 generates partially sheared particulate solids and sheared biological material which is returned to the bottom section 38 with the aforementioned tangential velocity. That tangentially directed flow combines with the upflow in the separator column 36 to produce a swirling or hydrocyclonic upflow. This circulates the media bed constituents in the separator column 36 to prevent the accumulation of biological material therein which, in prior art arrangements, can accumulate to a degree disruptive of upflow in the separator column 36. After introduction into the separator column 38, the sheared biological material ascends with the upflow and collects on the effluent head surface 32 before being washed into the draw-off port 64 to prevent any significant scum accumulation. Also, by withdrawing sludge from the effluent head surface 32 the liquid content of that sludge can be more closely controlled so as to require less processing (i.e., dewatering) to separate the biological and liquid components of the sludge.

While in the foregoing embodiment of the invention the control apparatus 34 is employed in a fluid bed biological reactor 12, it should be understood that a control apparatus embodying the invention could be used in other types of reactors for removing excess media material from bed particles.

Other features and advantages of the invention will be set forth in the following claims.

I claim:

1. A reactor apparatus comprising
a reactor for processing a liquid, said reactor containing a bed, said bed including particulate solids, and material supported on said particulate solids, the liquid forming a liquid effluent head extending above said bed, the liquid effluent head having an upper surface, and
means extending into said reactor for removing excess amounts of said material from said reactor, said means for removing excess amounts of said material including a tubular member emersed in the liquid effluent head and extending above said bed, means communicating with the interior of said tubular member for separating excess amounts of said material from said particulate solids, and a conduit extending from said tubular member for withdrawing separated material from said tubular member, said conduit including a draw-off port communicating with the upper surface of the liquid effluent head.

2. A reactor apparatus as set forth in claim 1 wherein said conduit is adjustable to raise and lower said draw-off port relative to the upper surface of the liquid effluent head to selectively decrease and increase the flow rate of separated material and liquid through said draw-off port.

3. A reactor apparatus as set forth in claim 2 wherein said reactor apparatus includes a telescoping sludge valve, said telescoping sludge valve being adjustable to raise and lower said conduit.

4. A reactor apparatus as set forth in claim 1 wherein said reactor apparatus includes a vertically adjustable valve, said vertically adjustable valve including said conduit, said conduit being positioned in said tubular member, and said conduit including a vertically extending opening forming said draw-off port, and wherein said vertically adjustable valve is adjustable to lower and raise said opening with respect to the upper surface of the liquid effluent head.

5. A reactor apparatus as set forth in claim 1 wherein said means for separating excess amounts of said material from said particulate solids includes means for withdrawing particulate solids having excess material thereon from said tubular member, means for shearing the excess material from those particulate solids, and means for tangentially returning the partially sheared particulate solids and sheared excess material to said tubular member.

6. A reactor apparatus as set forth in claim 5 wherein said means for withdrawing particulate solids having excess material thereon from said separator column includes a second conduit having an inlet concentric with said tubular member, and wherein said means for tangentially returning the partially sheared particulate solids and sheared excess material to said tubular member includes a third conduit extending tangentially from said tubular member.

7. A fluid bed reactor apparatus comprising
a reactor for processing a liquid, said reactor containing a bed, said bed including particulate solids having biological material supported thereon, the liquid being passed upwardly through said bed to fluidize said bed, and the liquid forming a liquid effluent head which extends above said bed and from which the liquid is discharged from said reactor, the liquid effluent head having an upper surface, and means for removing excess biological material from said reactor, said means for removing including a separator column, said separator column extending upwardly from said bed, and said separator column being emersed in the liquid effluent head, and means communicating with the separator column for withdrawing excess biological material from said separator column, said means for withdrawing communicating with the upper surface of the liquid effluent head.

8. A fluid bed reactor apparatus as set forth in claim 7 wherein said means for withdrawing excess biological material includes a conduit having a draw-off port communicating with the upper surface of the liquid effluent head.

9. A fluid bed reactor apparatus as set forth in claim 8 wherein said separator column has a lower section, wherein said conduit has at least one draw-off port, said at least one draw-off port defining an opening having a vertical first area, at least a portion of which extends beneath the upper surface of the liquid effluent head, wherein said reactor includes a discharge port defining an opening having a vertical second area, at least a portion of which extends beneath the upper surface of the liquid effluent head, said discharge port controlling the level of the upper surface of the liquid effluent head, wherein each of said reactor and said lower section of said separator column has a horizontal area, and wherein the ratio of said portion of said first area to said horizontal area of said lower section of said separator column is greater than the ratio of said portion of said second area to said horizontal area of said reactor.

10. A fluid bed reactor apparatus as set forth in claim 7 wherein said separator column includes a cylindrical lower section extending into said bed, and having an inner diameter, a cylindrical upper section extending above the upper surface of the liquid effluent head, and having an inner diameter greater than the inner diameter of said lower section, and an intermediate section converging downwardly from said upper section to said lower section.

11. A fluid bed reactor apparatus as set forth in claim 7 wherein at least a portion of said draw-off port extends below the upper surface of the liquid effluent head, said draw-off port portion being sized to withdraw excess biological material and liquid at a flow rate sufficient to provide an upflow velocity in said separator column at least as great as the upflow velocity in said reactor outside of said separator column.

12. A fluid bed reactor apparatus as set forth in claim 7 wherein said means for withdrawing excess biological material includes a vertically adjustable valve, said vertically adjustable valve being adjustable to raise and lower said draw-off port relative to the upper surface of the liquid effluent head to selectively decrease and increase the flow rate of separated excess biological material and liquid through said draw-off port.

13. A fluid bed reactor apparatus as set forth in claim 7 wherein said means for withdrawing excess biological material includes a vertically extending conduit within said separator column, said conduit including an upper end having a notch extending downwardly from said upper end, said notch forming said draw-off port, and wherein the position of said conduit is vertically adjustable to lower and raise said notch with respect to the upper surface of the liquid effluent head.

14. A fluid bed reactor apparatus as set forth in claim 13 wherein said means for withdrawing excess biological material includes a telescoping sludge valve for adjusting the vertical position of said conduit.

15. A fluid bed reactor apparatus as set forth in claim 7 wherein said means for removing excess biological material from said reactor includes means for separating excess biological material from said particulate solids, said means for separating including means for withdrawing particulate solids from said separator column, means for shearing excess biological material from those particulate solids, and means for tangentially returning the partially sheared particulate solids and sheared excess biological material to said separator column.

16. A control apparatus for removing excess biological material from a fluidized bed reactor wherein liquid to be processed is conducted upwardly therein through a bed at a velocity conducive to fluidization of the bed, the bed including particulate solids having biological material supported thereon, the liquid forming an effluent head above the bed, the effluent head having an upper surface, said control apparatus comprising a separator column including a lower section extending into the fluidized bed, and an upper section extending above the upper surface of the effluent head, and means communicating with the separator column for withdrawing excess biological material from said separator column, said means for withdrawing including a draw-off port communicating with the upper surface of the effluent head.

17. A control apparatus as set forth in claim 16 wherein said means for withdrawing excess biological material from said separator column includes means for adjusting the position of said draw-off port to selectively increase and decrease the flow rate through said draw-off port from the upper surface of the effluent head.

18. A control apparatus as set forth in claim 16 wherein said means for withdrawing excess biological material from said separator column includes a conduit, said conduit including said draw-off port, and said conduit being adjustable to raise and lower said draw-off port relative to the upper surface of the effluent head to selectively decrease and increase the flow rate through said draw-off port.

19. A control apparatus as set forth in claim 18 wherein said means for withdrawing excess biological material from said separator column includes a valve which is telescopically adjustable to raise and lower said conduit relative to the upper surface of the effluent head.

20. A control apparatus as set forth in claim 16 wherein said control apparatus includes means for separating excess amounts of the biological material from the particulate solids, said means for separating including means for withdrawing particulate solids having excess material thereon from the bed, means for shearing the excess material from those particulate solids, and means for tangentially introducing the partially sheared particulate solids and sheared excess material to the separator column, said means for tangentially introducing including a conduit extending tangentially from said separator column.

* * * * *